United States Patent
Barry et al.

(10) Patent No.: US 8,010,282 B2
(45) Date of Patent: *Aug. 30, 2011

(54) SYSTEM AND METHOD TO DISPLAY OPERATIONAL AND REVENUE DATA FOR AN AIRPORT FACILITY

(75) Inventors: James T. Barry, Madison, CT (US); Matthew Marcella, West Hempstead, NY (US); Ron Dunsky, Brooklyn, NY (US)

(73) Assignee: PASSUR Aerospace, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/446,614

(22) Filed: May 28, 2003

(65) Prior Publication Data

US 2004/0243302 A1 Dec. 2, 2004

(51) Int. Cl.
*G01C 21/00* (2006.01)

(52) U.S. Cl. ............... 701/204; 701/3; 701/10; 701/14; 701/120; 705/20; 340/945

(58) Field of Classification Search ................. 701/3–4, 701/8, 10, 14–16, 120–122, 200–202; 705/1, 705/5–11, 13, 20–23, 26–29; 340/945–947, 340/971–973, 825.22, 825.26, 825.27, 825.28, 340/825.29; 244/158 R; 725/37–40, 44, 725/47–52, 75–77; 709/200–202, 238

See application file for complete search history.

(56) References Cited

U.S. PATENT DOCUMENTS

| | | | |
|---|---|---|---|
| 5,652,867 A * | 7/1997 | Barlow et al. ...................... 703/6 |
| 5,918,209 A * | 6/1999 | Campbell et al. ................. 705/5 |
| 6,040,781 A * | 3/2000 | Murray .................... 340/825.22 |
| 6,102,331 A * | 8/2000 | Hong ........................ 244/114 R |
| 6,181,990 B1 * | 1/2001 | Grabowsky et al. ............ 701/14 |
| 6,278,913 B1 * | 8/2001 | Jiang ................................. 701/3 |
| 6,278,965 B1 * | 8/2001 | Glass et al. ..................... 703/22 |
| 6,282,487 B1 * | 8/2001 | Shiomi et al. ................. 701/120 |
| 6,353,794 B1 * | 3/2002 | Davis et al. ................... 701/201 |
| 6,493,610 B1 * | 12/2002 | Ezaki ................................ 701/3 |
| 6,711,548 B1 * | 3/2004 | Rosenblatt ....................... 705/6 |
| 6,732,027 B2 * | 5/2004 | Betters et al. .................. 701/29 |
| 6,754,581 B1 * | 6/2004 | Blachowicz et al. ......... 701/202 |
| 6,792,340 B2 * | 9/2004 | Dunsky et al. .................... 701/3 |
| 6,792,400 B2 * | 9/2004 | Alden et al. ...................... 703/2 |
| 6,816,762 B2 * | 11/2004 | Hensey et al. .................. 701/35 |
| 2002/0069293 A1 * | 6/2002 | Natalio ......................... 709/238 |
| 2002/0082848 A1 * | 6/2002 | Hansen et al. .................... 705/1 |
| 2002/0198747 A1 * | 12/2002 | Boyer et al. ...................... 705/5 |
| 2003/0014426 A1 * | 1/2003 | Gimbert et al. ............ 707/104.1 |
| 2003/0085818 A1 * | 5/2003 | Renton et al. ................. 340/945 |
| 2003/0139875 A1 * | 7/2003 | Baiada et al. ................. 701/120 |
| 2003/0191678 A1 * | 10/2003 | Shetty et al. ...................... 705/8 |
| 2003/0200138 A1 * | 10/2003 | Smith et al. ..................... 705/13 |
| 2004/0054550 A1 * | 3/2004 | Cole et al. ......................... 705/1 |
| 2004/0083126 A1 * | 4/2004 | Svenson et al. ................ 705/10 |
| 2004/0104824 A1 * | 6/2004 | Cole et al. ..................... 340/971 |

* cited by examiner

*Primary Examiner* — Gertrude Arthur Jeanglaud
(74) *Attorney, Agent, or Firm* — Fay Kaplun & Marcin, LLP

(57) ABSTRACT

A system, comprising a first computing device receiving data from an input feed, the data corresponding to one of operations data and revenue data of an airport facility, the first computing device organizing the data into files which are viewable by users of the system and an additional computing device connected via a communication network to the first computing device, receiving the files organized by the first computing device and displaying the files to a user.

22 Claims, 5 Drawing Sheets

| Flight | Arrived | Runway | Orig | Aircraft Type | Flight Fee | Max TO Weight | Invoice Amount |
|---|---|---|---|---|---|---|---|
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |
| 6A133 | 23:09:23 | 22L | LAX | 757-200 | $400 | 875,000 | $5,552 |

Averages: $400, 875,000, $6,562
Totals: 217, $78,112

Fig. 5

SYSTEM AND METHOD TO DISPLAY OPERATIONAL AND REVENUE DATA FOR AN AIRPORT FACILITY

BACKGROUND INFORMATION

Airports are the points of arrival and departure for passenger travel and air cargo. The passenger travel carriers include national and international airlines, regional airlines, commuter airlines and private planes and jets. Similarly, there are multiple air couriers transporting cargo via aircraft. An airport needs to effectively manage the multiple arrivals and departures for the airport facility in order to ensure passenger safety and convenience.

The management of this flow of air traffic through an airport facility requires a substantial expenditure on the part of the authority which owns or manages the airport facility. The expenditures include both airport systems (landside and airside terminals, towers, runways, maintenance, etc.) and personnel to perform the tasks associated with the operation of these systems. In order to recoup these expenditures, the airports charge the airlines for each arrival and departure. However, the airport operator needs an effective manner of tracking all the departures and arrivals in order to collect all the revenues due for the airport facility.

SUMMARY OF THE INVENTION

A system, comprising a first computing device receiving data from an input feed, the data corresponding to one of operations data and revenue data of an airport facility, the first computing device organizing the data into files which are viewable by users of the system and an additional computing device connected via a communication network to the first computing device, receiving the files organized by the first computing device and displaying the files to a user.

In addition, a system, comprising a first module configured to request displayable files from a computing device, the request being communicated via a communications network, the displayable files including data corresponding to one of operations data and revenue data of an airport facility and a second module configured to display the displayable files to a user, displayable files being one of a live view of the data and an archived view of the data.

Furthermore, a method, comprising the steps of requesting displayable files from a computing device, the request being communicated via a communications network, the displayable files including data corresponding to one of operations data and revenue data of an airport facility and displaying the displayable files to a user, the displayable files being one of a live view of the data and an archived view of the data.

A system, comprising a first display configured to display live operational data for an airport facility, the live operational data being information from a current day and including arrival information, departure information and runway configuration information and a second display configured to display archived operational data for the airport facility, the archived operational data being information for a predetermined time period and including arrival information and departure information.

BRIEF DESCRIPTION OF DRAWINGS

FIG. 3 shows a second exemplary GUI screen for presenting archived operational information to a user according to the present invention;

FIG. 4 shows a third exemplary GUI screen for presenting live revenue information to a user according to the present invention;

FIG. 5 shows a fourth exemplary GUI screen for presenting archived revenue information to a user according to the present invention.

DETAILED DESCRIPTION

Figure 1:
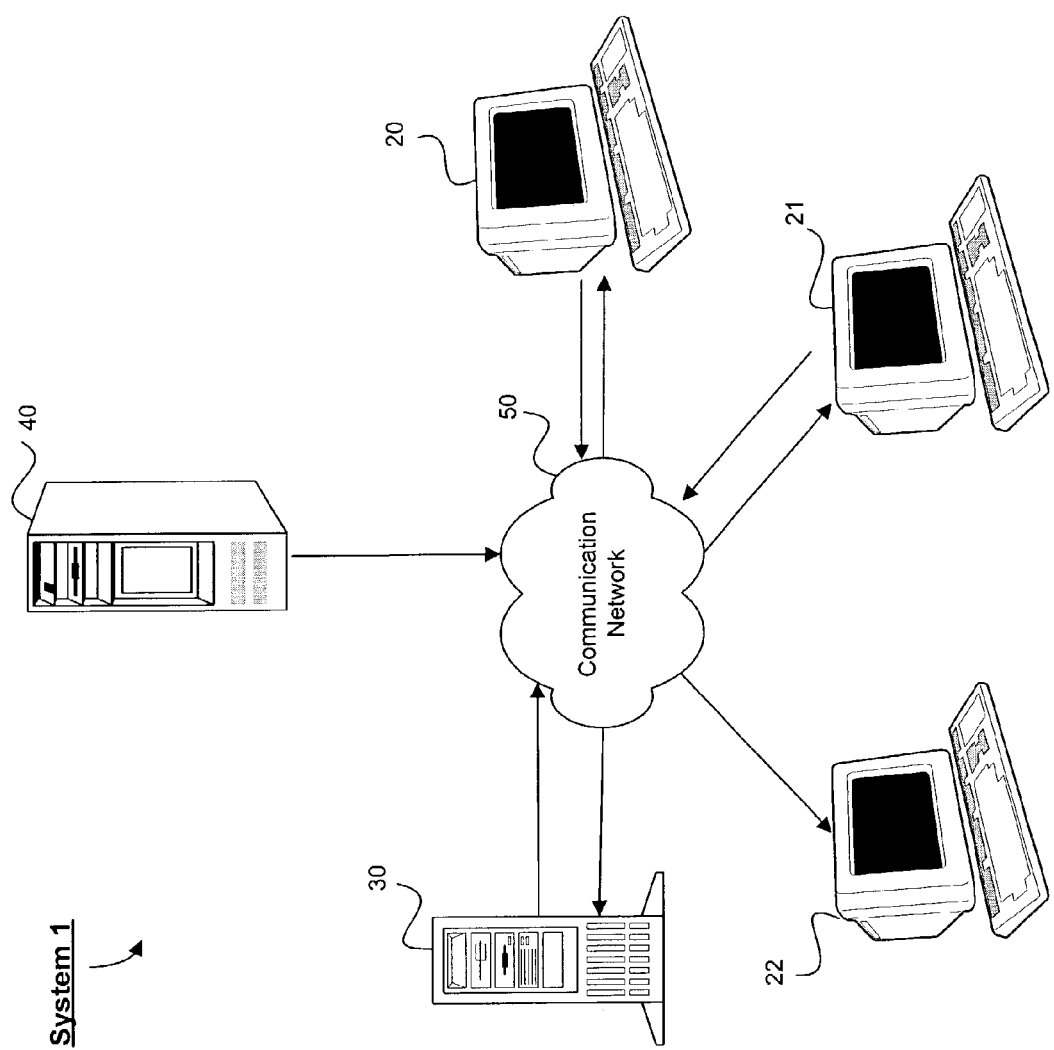
FIG. 1 shows an exemplary system according to the present invention.

The present invention may be further understood with reference to the following description of preferred exemplary embodiments and the related appended drawings, wherein like elements are provided with the same reference numerals. The exemplary embodiment of the present invention provides a system and method for tracking and managing the arrivals and departures at an airport facility and for managing the revenue stream of the airport facility based on the arrivals and departures. The exemplary embodiment of the present invention provides for these operations to be carried out in both a real time (or "live") manner and to store the necessary data for archiving and delayed display purposes. The exemplary embodiment shows the information provided to the users via easily readable graphical user interfaces ("GUI") in a web based delivery system. However, those of skill in the art will understand that there may be any number of other manners of implementing the present invention where other manners of displaying the information are used (e.g., additional GUIs, printouts, text files, etc.) and distributing the information in embodiments that are not web based.

FIG. 1 shows an exemplary system 1 according to the present invention. The system includes a main server 30 for storing the main database and hosting the web page (or other data distribution system). The main server 30 may be, for example, a standard PC based server system running an operating system such as LINUX. Those of skill in the art will understand that any computing platform may be used for the main server 30. The function of the main server 30 may also be distributed among a plurality of servers. The main server 30 may be connected to a communications network 50, for example, the Internet. A plurality of user's stations 20-22 may also be connected to the communication network 50. The user's stations 20-22 may be, for example, personal computers ("PCs") or other computing platforms having network or modem access. In addition, a data feed arrangement 40 may be connected to the communications network 50. In an alternative embodiment, the data feed arrangement 40 is connected directly to the main server 30. Each of the components of system 1 will be described in greater detail below.

The main server 30 may contain one or more databases containing various operational information about the airport facility. In the present description, the term database will be used to describe any manner of storing data or information including those manners other than a traditional database structure. The main server 30 may utilize a database server for the permanent or temporary logging and storage of every piece of information entered into the system 1 using a common industry language, such as, for example, standard query language ("SQL"). The main server 30 may also contain web server software to allow the main server 30 to host a web page or series of web pages in order to make the operational information available to the users 20-22. Thus, the information stored in the main database may be formatted for distribution to the users 20-22 via a standard distribution method such as web page based distribution. The web server of the main server may be capable of supporting any number of web or computer network based technologies, e.g., Hyper Text Mark-up Language ("HTML"), Java, JavaScript, C/C++, Perl, etc.

The users 20-22 may access the web page hosted by the main server 30 via the communication network 50. The users 20-22 may be able to gain access to the information via a web browser on the users' PCs through an advanced user authentication process requiring, e.g., passwords, challenges, network and/or individual computer identification (encrypted), monitoring tools, etc., in order to ensure the security of the system. Other security measures such as redundant web servers with secure socket layer encryption ("SSL") may also be used as is known in the art. Those of skill in the art will understand that the system 1 is only exemplary and there may be multiple other systems and system configurations for collecting and distributing the information described below.

The data feed arrangement 40 may automatically feed data from an outside data source to the main server 30. Examples of a data feed arrangement 40 may include, for example, the PASSUR™ System by Megadata Corporation of Babylon, N.Y., the ASD data feed provided for resale from the FAA, any active or passive radar systems in use by the airport facility, etc. The PASSUR™ System is a passive radar, which, without emitting any active signals, receives aircraft identification and altitude information from aircraft transponder transmissions, which are interrogated by existing secondary surveillance radars. More information on the PASSUR™ System is provided by Megadata Corporation at www.passur.com. The data feed arrangement may be one or more outside data sources. Other examples of data feed arrangements may include live schedule information and delay and cancellation information which are provided by third party vendors. As described above, the data feed arrangement 40 may input the information via the communications network 50 or by a direct connection to the main server 30.

As will be described in greater detail below, the system 1 will allow the users 20-22 to view operational and revenue information both for the current day's operations at the airport facility ("live") and for past day's operations ("archive"). Thus, in order to provide live views to the users 20-22, the data feed arrangement 40 will be providing live data which will be processed by the main server 30 so that the users 20-22 may access the live views. A more complete list of the types of data provided by the data feed arrangement 40 and processed by the main server 30 will be provided below. However, the following provides an example of live data and the processing of this data.

As an aircraft is approaching the airport facility the data feed arrangement 40 may be collecting various information from the aircraft (or its radar signature). For example, the PASSUR™ System described above may provide data on the aircraft which includes a track identification, the time (e.g., UNIX time), the x-position, the y-position, altitude, x-velocity component, y-velocity component, z-velocity component, the speed, the flight number, the airline, the aircraft type, and provides this information every 4.6 seconds for the aircraft. Thus, if the PASSUR™ System is the data feed arrangement 40, the main server 30 is receiving this information every 4.6 seconds. The main server 30 must then format this information to be distributed to the users 20-22 within a very short time frame, e.g., less than 1 second. Thus, the users 20-22 may view live information as it is actually happening. For example, the data feed arrangement 40 may track the location and altitude of the plane and send this data to the main server 30. When the main server 30 receives location and altitude information indicating the aircraft has landed, the main server 30 will format the information to indicate the arrival of the aircraft and the users 20-22 may view this arrival information for the flight within seconds of the actual arrival.

Figure 2:
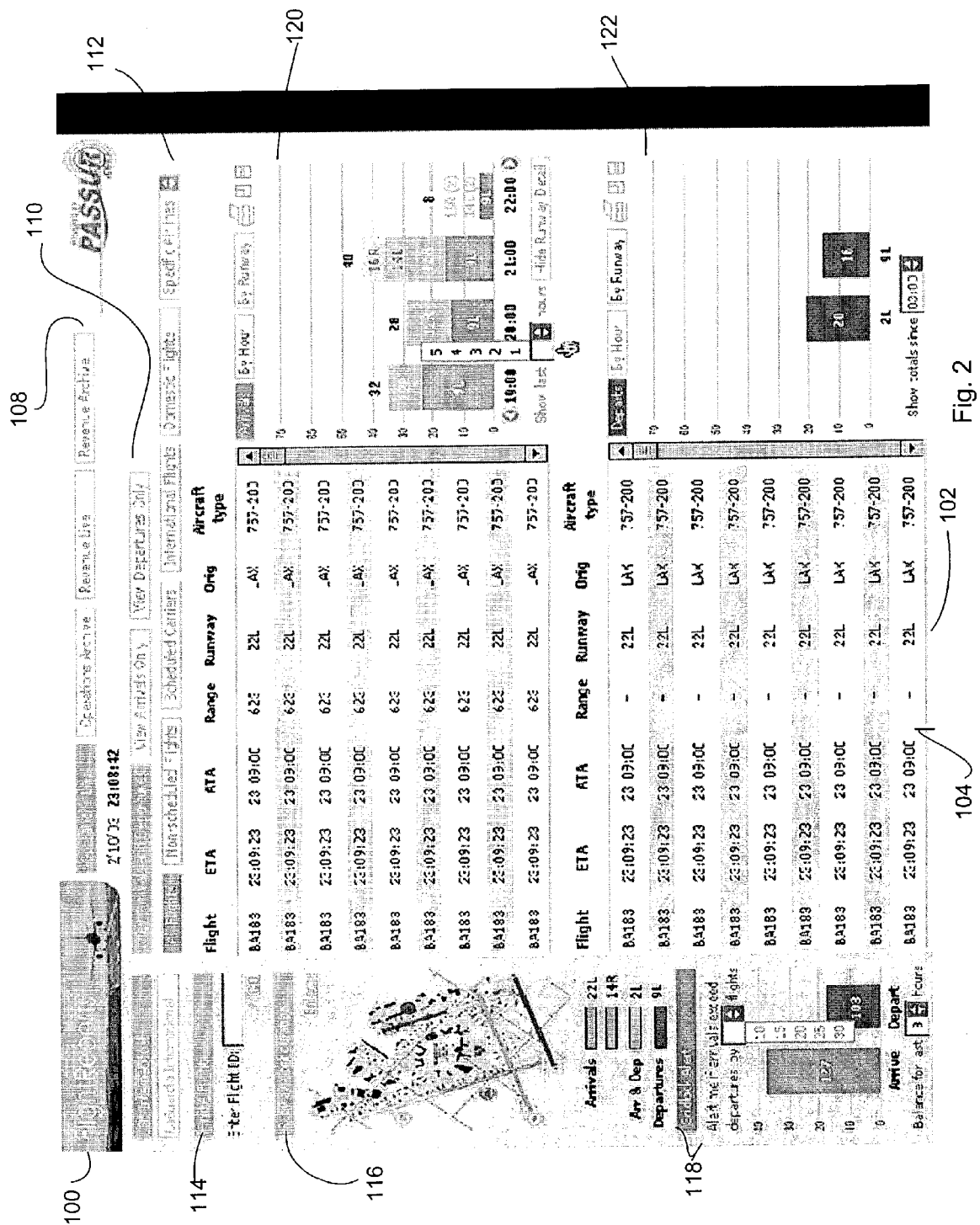
FIG. 2 shows a first exemplary graphical user interface ("GUI") screen for presenting live operational information to a user according to the present invention.

FIG. 2 shows a first exemplary GUI screen 100 for presenting operational information to a user of the exemplary system 1. The exemplary GUI screen 100 is provided to present a live view of the operational information for the airport facility to the users 20-22. The GUI screen 100 includes a current view portion 108 which indicates to the users 20-22 which particular screen the user is currently displaying. In this example, there are four possible views, an operations live view, and operations archive view, a revenue live view and a revenue archive view. The operations live view icon of current view portion 108 is highlighted because the exemplary GUI screen 100 presents a live view of operational data. The remaining exemplary views will be described in greater detail below.

Those of skill in the art will understand that the four views described in detail below are only exemplary and there may be additional views which can be used to convey the same information as described for the exemplary views, i.e., the same information formatted in a different manner, and additional views to convey other types or categories of information. As described above, the information is input from a data feed arrangement and these data feed arrangements may be configured to input a variety of differing information about flights and aircrafts.

In a first arrival/departure ("A/D") screen portion 102, an arrival grid 106 displays individual arrivals and a departure grid 104 displays individual departures for the airport facility. In the exemplary GUI screen 100 (and the additional GUI screens described below), the exemplary flight information shown in the A/D screen portion 102 are copies of the same information for an exemplary flight. Those of skill in the art will understand that, in actual operation, each flight entry displayed in the A/D screen portion 102 will be unique individual flights. Thus, each individual line of the A/D screen portion 102 will display a unique flight and the information for that flight.

The operational information provided to the users 20-22 by the A/D screen portion 102 may include, the flight identifier (e.g., Flight BA183), the estimated time of arrival/departure ("ETA") (e.g., 23:09:23), the actual time of arrival/departure ("ATA") (e.g., 23:09:00), the range of the aircraft (e.g., 623 miles), the runway of arrival/departure (e.g., 22L), the airport of origination of the flight (e.g., LAX) and the aircraft type (e.g., 757-203). Those of skill in the art will understand that these categories of information are only exemplary and that an individual airport operator may configure the A/D screen portion 102 to show the information which is relevant for the particular airport facility.

As described above, the data feed arrangement 40 may automatically feed data from an outside data source to the main server 30. Each of the categories of information described above (and any additional categories described further in this specification) may be input into the main server 30 by the data feed arrangement 40. The main server 30 may then save the data in a database, as described above, and configure the data to be displayed to the users 20-22. In addition, an individual user 20-22 may also have permission to manually input additional data into the main server 30 which may then also be displayed to all the users 20-22. There may be various levels of protections to identify users which may enter data and users which have view only privileges to the system 1.

FIG. 1 shows that the users 20 and 21 have two-way access to the information on main server 30, while user 22 is restricted to view only status.

Expanding on the information described above that may be displayed on the A/D screen portion 102, the ETA may be an estimate of the arrival time based on a set of measured parameters for the flight which are input from the data feed arrangement 40 to the main server 30 or derived by the main server 30 from the input information and the behavior of other aircraft on the current day and historically. For example, the distance from the airport of an arriving flight, the airspeed, the time it took for a similar plane at a similar location to arrive, etc. The ETA may be constantly updated as new parameters are input. The entry for the ATA may be displayed when the desired action occurs, i.e., the flight has arrived/departed, as indicated from the information input from the data feed arrangement 40. The airport operator may not display the range and origin of departing flights because a flight that has not departed clearly has no range from the airport facility and the origin will be the airport facility for all departures. Thus, the airport operator may display alternate information in the departure grid 104, e.g., destination information, etc.

The A/D screen portion 102 allows a user to view individual arrivals and departures at a glance on an easy to read line-by-line basis. This may allow the user to plan for arrivals/departures of special interest and also to search for an individual flight of interest. For example, the GUI screen 100 may include a find flight portion 114 where a user may enter the identification of a particular flight or any other detailed information such as a particular arrival/departure time, runway, airline, etc. If a flight matches the information provided by the user in the find flight portion 114, the arrival grid 106 and/or departure grid 104 may automatically scroll to center that flight in the grids 104 and/or 106 and highlight the entire line in the grids 104 and/or 106. The highlight may be for example, a color indication, a flashing indication, etc.

In another example, the A/D screen portion 102 may include a feature which tracks the deviation of the ETA and the ATA. For example, the GUI screen 100 may have a user settable time-delta function which can be used to alert the user when the deviation between the ETA and ATA is greater than the set time. In a specific example, a user may set the time-delta function for 20 minutes. Thus, whenever a flight on the A/D screen portion 102 reaches a 20 minute difference between the ETA and the ATA, the user is alerted of the deviation. The alert may be a visual signal (color, flashing, etc) and/or an audio signal.

Furthermore, a user may view the departures and arrivals for an immediately previous time frame, e.g., the departures for the last (n) hours. The arrival grid 106 and the departure grid 104 may be updated at regular intervals to clear flights that have previously arrived and/or departed, respectively, e.g., all flights that have arrived/departed more than (n) hour(s) ago are removed from the arrival grid 106 and the departure grid 104. The time for removing flights from the grids 104 and 106 may be set by the individual user. However, as will be described in greater detail below, this information is not lost to the user, since it may be retrieved via an archive screen provided by the exemplary embodiment of the present invention. Similarly, new flights may appear on the grids 104 and 106 within (n) hours of their scheduled arrival/departure so that a user may keep track of their progress.

The A/D screen portion 102 also includes a first set of selection buttons 110 for the user to select the layout of the A/D screen portion 102. In this example, the user may select to view arrivals and departures, arrivals only or departures only. In addition, the size and relative position of the arrival grid 106 and the departure grid 104 may be manipulated by the user using known methods.

The A/D screen portion 102 also includes a second set of selection buttons 112 for the user to select various subsets of flights to be displayed in the arrival grid 106 and/or departure grid 104. The exemplary buttons 112 shown for the GUI screen 100 include an all flights button, a non-scheduled flights button, a scheduled carrier button, an international flight button, a domestic flight button and a specific airline button. As described above, the information which is displayed on the GUI screen 100 is saved in the main server 30 in, for example, a database form. Each of the buttons 112 may be associated with a particular query command which may then be used to display the requested information. For example, when a user selects the domestic flights button, this may send a query to the main server in the form of querying the database(s) to select only those records for flights which include an origin and destination field matching a previously input list corresponding to all the designations of domestic airports. The main server 30 will then return only those records for those flights matching this query and the arrival grid 106 and departure grid 104 will display the flight information for these matches.

In a further example, all scheduled flights may have a field indicating that it is a regularly scheduled flight or all scheduled flights may have a scheduled departure/arrival time, e.g., ETA. Whereas, a non-scheduled flight may not have the scheduled flight field or it may not have an ETA because it is not scheduled. Thus, the buttons for scheduled and non-scheduled flights may be associated with a query using these fields. The GUI screen 100 may be configured such that additional buttons may be added to the display and a query be associated with the newly added button. This is described in greater detail below. In addition, a user may change the names on existing buttons to match the terminology used at the particular airport facility.

In addition, the user may have the ability to manually assign various queries via a user input box. For example, the specific airline button may have a pull-down menu which lists several airlines and an associated query. However, there may be an airline which is not listed in the pull-down menu and the user wants see a listing of ths airline. In this case, the user may have the ability to enter a query via a pop-up box to include only those flights from an unlisted airline. Similarly, the user may desire to see all the flights which have arrived on a particular runway or from a particular origin and there are no predefined buttons 112 to display using these filters. Thus, the user may select a button (not shown) to format a query to display this information. The query may be entered by the user in a pop-up box in, for example, a field and data type format and the query may be executed on the database(s) of the main server 30. The matching records may then be displayed by the user on the GUI screen 100. A further feature may be that the user can then associate the query with a button. For example, the user may be allowed to add an airline to the pull-down menu and associate the new entry with the correct query. In this manner, the next time the user desires to display the flights for that particular airline, the user may then simply select the airline from the pull-down menu without having to generate a new query.

The GUI screen 100 may also be configured to allow for the printout of the arrival grid 106 and the departure grid 104. Similar to the various displays and filters for the viewable arrival grid 106 and the departure grid 104, the printable versions may be filtered in the same manner and printed in a format according to an individual user's preferences.

The GUI screen 100 may also include a runway configuration portion 116 which displays the current runway configuration to the user. The exemplary runway configuration portion 116 of the GUI screen 100 shows a viewable diagram representing the runways at the airport facility. The runways may be displayed in a color code to indicate the configuration of each individual runway. The specific color codes are not shown in the black and white drawing of FIG. 2, but exemplary color codes will be described. A first color code may be a code to easily identify runways which are configured for arrivals only, e.g., all runways currently configured for arriving flights only are shown in green on the viewable diagram. A second color code may be a code to easily identify runways which are configured for departures only, e.g., all runways currently configured for departing flights only are shown in red on the viewable diagram. A third color code may be a code to easily identify runways which are configured for arrivals and departures, e.g., all runways currently configured for arriving and departing flights are shown in blue on the viewable diagram. A fourth color code may be a code to easily identify runways which are not currently receiving any traffic, e.g., all runways currently not receiving traffic are shown in gray on the viewable diagram.

The runway configuration portion 116 allows a user to easily view the current runway configuration at a glance based on simple diagrams and color codes. These diagrams and codes convey information quickly and efficiently and keeps users up to date on the most recent configuration changes. The runway configuration portion 116 may also contain a legend showing the color codes and their meaning. As shown in FIG. 2, the legend is displayed under the viewable diagram of the runway configuration portion 116. The legend shows the color codes associated with the arrival runways, the departure runways and the arrival/departure runways. In addition, the designations of the current runways for each of these configurations is shown.

A further feature of the viewable diagram of the runway configuration portion 116 may be that only a portion of the runway is color coded (e.g., one-half of the runway on diagram is color coded). This may convey the directional information for the runway to the user. For example, on an arrival runway the portion of the runway shown in green may indicate that the flights are arriving from the direction of the colored portion. It may also be possible to include movable arrows (or other such icons) on the viewable diagram to show the direction of the arrivals and departures. The runway configuration portion 116 may also be enlarged by a user to show the viewable diagram and the legend in a larger size.

The runway configuration may be entered and updated by a user 20-22 of the system 1 so that each of the users 20-22 may view the current runway configuration. However, the runway configuration may also be updated automatically based on the data which is input from the data feed arrangement 40. As described above, the data feed arrangement 40 may include information concerning the location and altitude of an arriving flight. The main server 30 will receive this information and make a determination that the flight has actually arrived. The location information may indicate the runway on which the flight has arrived. The main server 30 may then determine that this particular runway is configured for arrivals. Similarly, the data feed arrangement 40 may determine that a flight is departing, the runway location of the departure and flight identification information. Again, using this data it may be determined that the runway is configured for departures. Various algorithms may be employed to determine a runway configuration based on the data from the data feed arrangements.

The GUI screen 100 may also include a gridlock alert portion 118 which may aler a user to a possible gridlock situation at the airport facility. A gridlock situation may occur when arrivals are exceeding departures. For example, the airport may be receiving many more planes via arrivals than it is losing from departures. Thus, a gridlock situation may occur because there are numerous planes in the runway queue waiting to depart, numerous planes at the terminal gates waiting to receive clearance to get into the runway queue for departure and numerous arrived planes which are attempting to gain access to the terminal gates. In order to effectively manage the departure and arrival schedule, the airport operator may need to know when there is an excess amount of arrivals and the possibility of a gridlock situation. The actual amount of excess arrivals which could lead to a gridlock situation may depend on the particular airport facility.

The gridlock alert portion 118 allows the user to set the number of previous hours and the number of arrivals and departures which are to be measured for alerting the user of a gridlock alert situation. For example, as shown in the exemplary gridlock alert portion 118, the user may set the review period to include the previous 3 hours. Similarly, the absolute number of arrivals exceeding departures for which an alert should be generated may be set to any number or a preselected number as shown in the exemplary pull-down menu (e.g., 10, 15, 20, 25, 30). If the number of arrivals exceeds the number of departures by the selected number in the selected time frame, the system 1 may alert the user via an alarm such as a visual signal (e.g., a flashing color alert, a pop-up box, etc.) and/or an audio signal.

The gridlock alert portion 118 may also show the absolute number of arrivals and departures in the selected time frame. In the exemplary GUI screen 100, the number of arrivals and departures are displayed both in a numerical fashion and as a bar graph. The bar graph may be scalable based on the number of flights arriving at a particular airport facility. Any other type of display may also be used to display the values to the user. The arrival and departure bar graphs (or other displays) may be color coded in the same manner as the color coding of the runway configuration portion 116 so that the user may infer the same meaning from the same colors presented on the GUI screen 100.

The GUI screen 100 may also include an arrival graph 120 and a departure graph 122. The graphs 120 and 122 provide users an overview of the arrivals and departures by hour (or for a cumulative block of hours). This information simultaneously conveys the total number of arrivals and departures and the runway usage associated with these arrivals and departures. The information may be stored for the duration of a full day so that hourly totals may be reviewed or added cumulatively.

The arrival and departure graphs 120 and 122 show the information in bar graph form. The exemplary display for the arrival graph 120 shows that the arrivals are shown in bar graph form showing the cumulative arrivals for each hour. The individual hours are broken into sections of the bar graph to show the activity on each runway. For example, for the 19:00 hour period there were 32 total arrivals of which 21 were on runway 9L and 11 were on runway 12R. The user may select to hide the runway details and merely show the total number of arrivals without a runway breakdown.

As shown in arrival graph 120, the user may select the number of hours to be displayed simultaneously on the graph and has the ability to scroll front and back to view additional hours. The bar graphs may also be color coded similar to the color codes described above for the runway configuration portion 116. For example, the arrival only information in the runway configuration portion 116 and the gridlock alert portion 118 may be color coded green. Thus, the bars on the arrival bar graph 120 may also be color coded green to visually indicate to the user that the graph is associated with arrival information. The different runway segments within each bar of the bar graph may be color coded in various shades of green.

The departure graph 122 shows an alternate view for displaying arrival and departure information. In this example, the bar graph is configured to show the departures by runway for a user selected period of time. In this example, the time selected is 3:00 hours and the departure graph 122 shows that there were 20 departures from runway 2L and 16 departures from runway 9L. Color coding may also be used in the exemplary bar graph shown for departure graph 122. Those of skill in the art will understand that the departures may be displayed in the manner described above for the arrival graph 120 and the arrivals may be displayed in the manner described above for the departure graph 122. These graphs 120 and 122 may also be configured to be printable.

As can be seen from the above description, the live operational information may be used by the users to better manage the day-to-day operations of the airport facility. For example, the view can be used to manage terminal gates, manage runway maintenance, etc. In a specific example, there may be a report of debris on a particular runway. A user can search for aircraft that have recently departed on that runway and report the finding of debris to those airlines. In this manner, the airlines may alert the those planes which departed from the runway to be aware that there may be a problem with the aircraft, e.g., the debris is from a blown out tire on the aircraft.

In another example, the airport operator (or other entity) having access to the exemplary system according to the present invention is responsible for the staffing of immigrations and customs for arriving flights. This staffing includes both the location and timing of the staff. Thus, personnel may have to be moved from terminal to terminal based on the arrival schedule of international flights at various terminals and more staff may be employed during peak arrival times. The live operations view (e.g., the arrival information) may be used by the airport operator to staff the correct locations at the correct time to most efficiently handle the arriving passengers.

Figure 3:
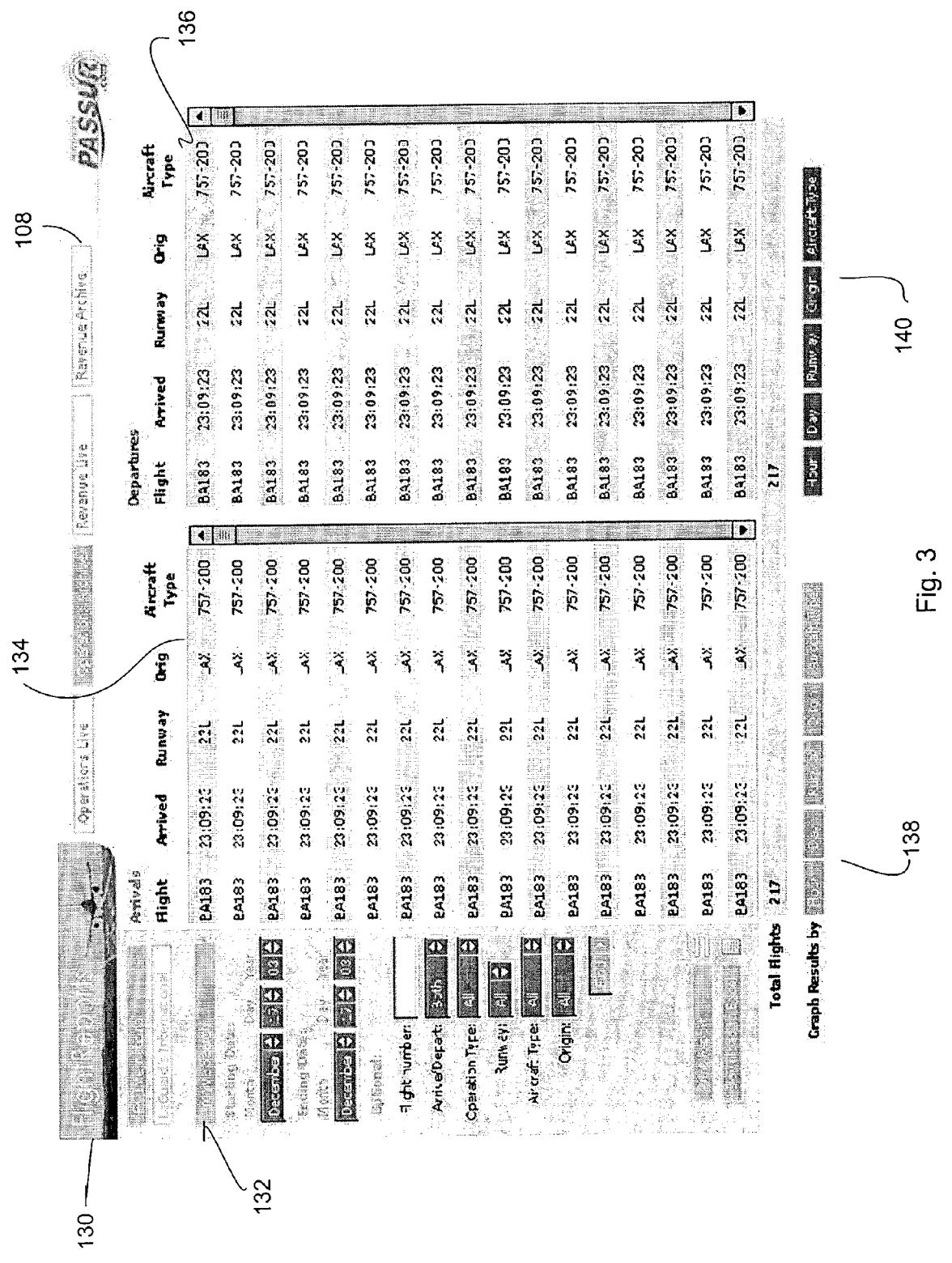

FIG. 3 shows a second exemplary GUI screen 130 for presenting archived operational information to a user 20-22. As shown in FIG. 3, the operation archive view is highlighted in the current view portion 108 of the GUI screen 130. Similar to the live operations screen described above, the GUI screen 130 allows a user to view reports of individual arrivals and departures. However, the archived view of the GUI screen 130 allows the user to view results over a longer period of time because the search is performed on archived data that may present multiple days of operations. The live operation view described above is generally limited to the time frame of the particular day on which the user is viewing the data because the live view may be used to manage current operations of the airport. Whereas, the archive view presented by GUI 130 may be used for longer term purposes not associated with the current day's operation of the airport, e.g., the shifting of runway traffic on a long term basis, the allocation of departure and arrival slots to airlines, the viewing of runway usage for maintenance purposes, etc.

Because the archive view of GUI screen 130 has the ability to display large quantities of data for multiple day operations to the user, the GUI screen 130 includes a search portion 132 which allows the user to systematically search the archives stored on the main server 30. As shown in search portion 132, there are various search fields which the user may complete in order to refine the search. If the user desires to perform a broad search, the user may complete only a single field, while additional completed fields will narrow the search. The search fields may include a starting and ending date field, a flight number field, an arrival/departure field, an operation type field (e.g., scheduled, non-scheduled, domestic, international, etc.), a runway field, an aircraft type field and an origin field. These search fields are only exemplary and other fields may be added based on the data which is stored for each flight record in the main server 30 database(s).

The user may also select whether the results of the search should be displayed on the GUI screen 130, printed on a printable format or downloaded to a spreadsheet program. Those of skill in the art will understand that these various output types are only exemplary and there may be other types of output formats which are supported by the system 1. Thus, a user will complete the desired fields in the search portion 132 of the GUI screen 130 and send the search command to the main server 30 to retrieve all the flight records matching the query parameters. The main server will then send the results of the query to the user in the output format selected by the user.

In this example, the user selected to view the results on the GUI screen 130. The results are shown on arrival grid 134 and departure grid 136. Each result is shown on a line-by-line basis in a similar manner as described above for the arrival grid 106 and departure grid 104 of the exemplary GUI screen 100. Detailed information about each flight is provided in the arrival and departure grids 134 and 136. For example, the flight number, the time of arrival/departure, the runway of arrival/departure, the origin of arriving flights, the destination of departing flights and the aircraft type. The arrival grid 134 and departure grid 136 may also show the total number of results for each search (e.g., 217 arrivals and departures in the example of FIG. 3).

In addition, the GUI screen 130 includes a series of arrival formatting buttons 138 and departure formatting buttons 140. The corresponding buttons for each of the arrival formatting buttons 138 and departure formatting buttons 140 perform the same functions for the arrivals and departures, respectively. Therefore, the functions for the arrival formatting buttons 138 will be described, but it should be understood that the same functions apply to the departure formatting buttons 140.

The first button is an hour button which, when pressed, sorts the results in the arrival grid 138 by hour and displays the results in a bar graph form in the place of the arrival grid 134. Similarly, the day button sorts the results in the arrival grid 138 by day and displays the results in a bar graph form in the place of the arrival grid 134. The runway button sorts the results in the arrival grid 138 by runway and displays the results in a bar graph form in the place of the arrival grid 134. The origin button sorts the results in the arrival grid 138 by origin and displays the results in a bar graph form in the place of the arrival grid 134. Finally, the aircraft type button sorts the results in the arrival grid 138 by aircraft type and displays the results in a bar graph form in the place of the arrival grid 134.

As can be seen from the above description, the buttons perform a sorting function on the displayed search results and then display the results based on the sort requested by the user. Accordingly, additional buttons may be added based on any sort parameters which an individual user may desire to see the search results. The bar graphs for these search results will be of a similar type to the bar graphs described above for the arrival graph 120 and departure graph 122 of the GUI screen 100.

Thus, the archive view of the GUI screen 130 allows a user to select various search parameters in order view operational information segmented in various manners according to the search parameters. Those of skill in the art will understand that there are numerous reasons for selecting search parameters and multiple types of information which may be gathered from the results of these searches. The following are examples of how the search results may be used.

In a first example, the user may search for a particular flight which is scheduled to arrive at a certain time each day. The user may view the actual arrival time of the flight over a long period of time (e.g., several weeks, several months, etc.). Based on the search of the archived information for this flight, the user may determine that the flight has a tendency to arrive late by approximately ten minutes each day. Based on this information, the user (an airport operator) may re-allocate the arrival spot for this flight to a later time to better manage the arrival slots for the airport facility.

In a second example, the airport operator may be deciding to expand the airport facility by providing additional runways. However, because the airport operator may not be able to add runways for all configurations, the airport operator may desire to determine those runways which have the most usage so the additional runways can lessen the strain of usage on these highly used runways. Thus, the user may search the archives based on runway usage. The user may then view the results over a long period of time to determine the trend of runway usage in order to make an informed decision about runway expansion. Once again, these are only two examples of manners in which the archived data may be queried and used to more effectively manage the operation of an airport facility. Those of skill in the art will be able to formulate any number of searches to provide valuable information for airport operation.

Figure 4:
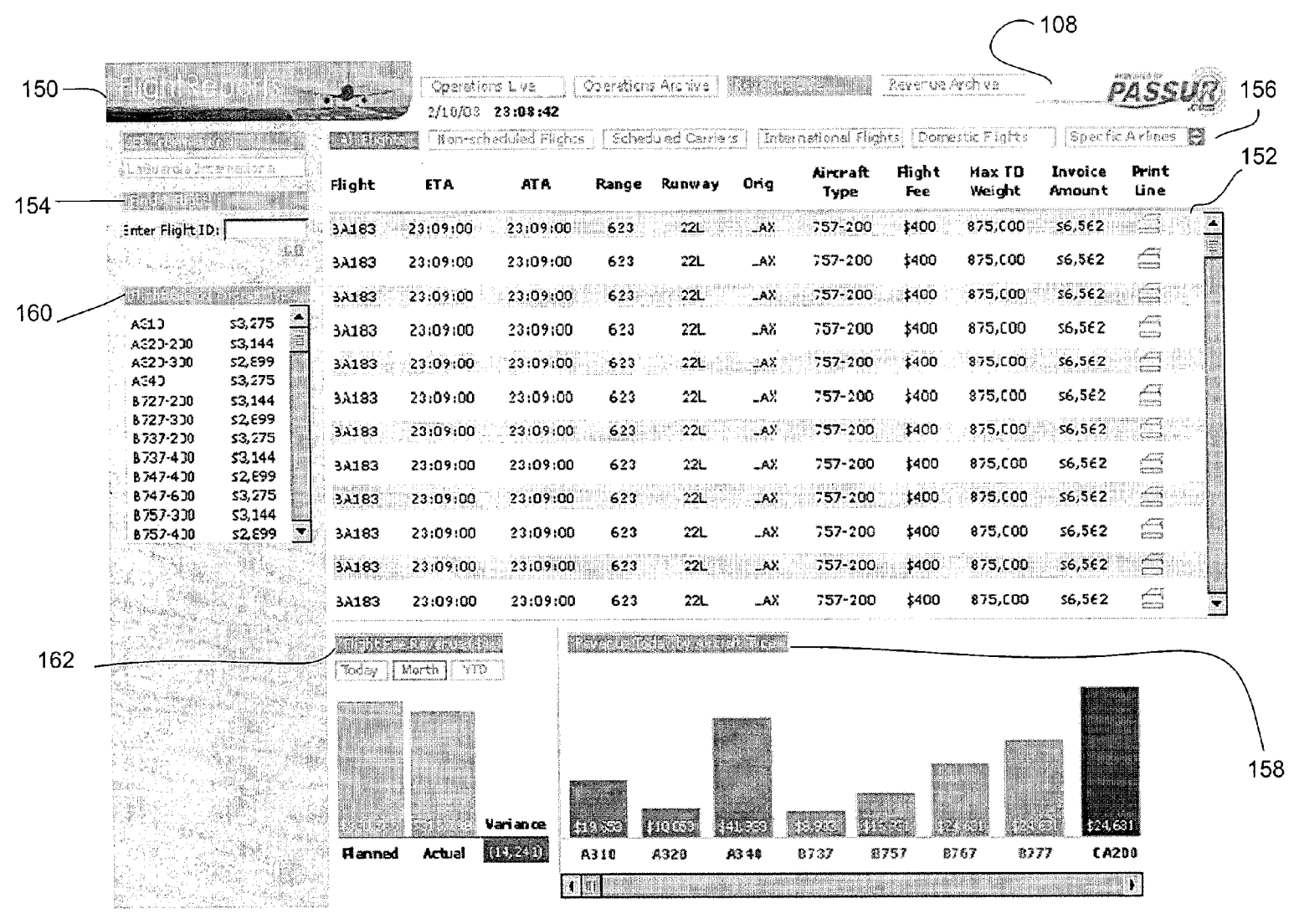

FIG. 4 shows a third exemplary GUI screen 150 for presenting live revenue information to a user. As shown in FIG. 4, the revenue live view is highlighted in the current view portion 108 of the GUI screen 150. The live revenue view shown on exemplary GUI screen 150 allows a user to view revenue data for the current day's operation for the airport facility. The GUI screen 150 includes an arrival grid 152 which displays individual arrivals on a line-by-line basis. The revenue information provided to the users 20-22 by the arrival grid 152 may include, the flight identifier, the ETA, the ATA, the range of the aircraft, the runway of arrival, the airport of origination, the aircraft type, the flight fee, the maximum takeoff weight and the invoice amount for the flight. Those of skill in the art will understand that these categories of information are only exemplary and that an individual airport operator may configure the arrival grid 152 to show the information which is relevant for the particular airport facility.

The majority of the information provided by the arrival grid 152 of the GUI screen 150 is similar to the information described with reference to the arrival grid 106 of the GUI screen 100 and therefore this information will not be described for a second time. However, the arrival grid 152 also includes the flight fee which is the rate the airline will be charged for each arrival, the maximum takeoff weight which is the weight of the plane on which the airline will be charged and the invoice amount for the arrival which is the flight fee multiplied by the maximum takeoff weight.

It should be noted that the values shown in the exemplary arrival grid 152 are only exemplary and do not reflect the actual values. For example, it should be clear that the exemplary flight fee of $400 multiplied by the maximum takeoff weight of 875,000 is not equal to the invoice amount of $6,562. However, when the arrival grid 152 is populated with actual values the invoice amount will be equal to the flight fee multiplied by the maximum takeoff weight. In addition, this example assumes that the airport operator charges based on a flight fee multiplied by the maximum takeoff weight and this will be carried through the remainder of the revenue description. However, those of skill in the art will understand that there may be alternate manners of charging for airport usage and the system 1 may be formatted in a manner to reflect these alternate manners of charging.

The arrival grid 152 allows authorized users to enter and edit the flight fee. The airport may have different flight fees based on different flight parameters. For example, there may be different flight fees for a standard scheduled flight, a non-scheduled flight, time of day variations, pre-paid fees, length of layover, etc. Thus, the user may enter different flight fees as appropriate into the flight fee field in the arrival grid 152. In addition, the system 1 may automatically fill in the appropriate fee in the flight fee field for each flight. The main server 300 may include a listing of flight fees and the parameters associated with each of the flight fees. For example, the system 1 may determine the aircraft type, the operation type (e.g., scheduled, non-scheduled, etc.), and the maximum takeoff weight and using this information the flight fee field is filled in automatically. The user may then edit the flight fee field based on other parameters. Similarly, an authorized user may be allowed to edit the maximum takeoff weight.

The arrival grid 152 allows a user to view individual arrivals and the revenue associated with each flight at a glance on an easy to read line-by-line basis. This may allow the user to plan for arrivals of special interest and also to search for an individual flight of interest. For example, the GUI screen 150 may include a find flight portion 154 where a user may enter the identification of a particular flight or any other detailed information such as a particular arrival/departure time, runway, airline, etc. If a flight matches the information provided by the user in the find flight portion 154, the arrival grid 152 may automatically scroll to center that flight in the arrival grid 152 and highlight the entire line. The highlight may be for example, a color indication, a flashing indication, etc.

Furthermore, a user may view the and arrivals and associated revenue information for an immediately previous time frame, e.g., the arrivals for the last (n) hours. The arrival grid 152 may be updated at regular intervals to clear flights that have previously arrived. The time for removing flights from the arrival grid 152 may be set by the individual user. Similarly, new flights may appear on the arrival grid 152 within (n) hours of their scheduled arrival so that a user may keep track of their progress.

As shown in FIG. 4, the user may also press a print button to print out a record of the flight arrival to present to the aircraft operator. This printout may be in place of an actual invoice or may be back-up information for an invoice which will be presented later to the aircraft operator. Similarly, multiple entries may formatted to be presented on a single printout. In a further exemplary embodiment, the system 1 may be configured to send this information automatically to the airline via, for example, electronic mail.

The GUI screen 150 also includes a set of selection buttons 156 for the user to select various subsets of flights to be displayed in the arrival grid 152. The exemplary buttons 156 shown for the GUI screen 150 include an all flights button, a non-scheduled flights button, a scheduled carrier button, an international flight button, a domestic flight button and a specific airline button. The information which is displayed on the GUI screen 150 is saved in the main server 30 in for example, a database form. Each of the buttons 156 may be associated with a particular query command which may then be used to display the requested information. For example, when a user selects the domestic flights button, this may send a query to the main server in the form of querying the database(s) to select only those records for flights which include an origin and destination field matching a previously input list corresponding to all the designations of domestic airports. The main server 30 will then return only those records for those flights matching this query and the arrival grid 152 will display the flight information for these matches. A more detailed description of selection buttons is described above with reference to the GUI 100. The selection buttons 156 of the GUI 150 will operate in a manner similar to that described above for the selection buttons of the GUI 100.

The GUI screen 150 may also include an aircraft type revenue ("ATR") portion 158. The ATR portion 158 provides the user with an easily viewable at-a-glance summary of all arrivals in a given time period (e.g., current day). The ATR portion 158 includes a bar graph of the timer period revenue by aircraft type. For example, the exemplary ATR portion 158 shows that in the current time period the A340 aircraft type has generated $41,933 in revenue. The bar graph shows the revenues both in bar graph form and a numerical value is also provided. The bars may also be color coded to provide visual distinction for each of the different types of aircraft.

The GUI screen 150 may also include an aircraft type flight fee ("ATFF") portion 160. The ATFF portion 160 provides a quick reference guide to the amount of revenue generated by an arrival of each aircraft type. For example, the revenue for a A340 aircraft type is $3,275. Again, the revenue numbers are a function of the flight fee and the maximum takeoff weight. As described above, there may be different fees based on different scenarios for each flight. The ATFF portion 160 may reflect the various scenarios. In an alternative embodiment, the user may enter values in the ATFF portion 160 which then get reflected in the arrival grid 152.

The GUI screen 150 may also include a flight fee revenue ("FFR") portion 162 which provides the user with the ability to compare planned revenue with the actual revenue generated in the selected time period. The selected time period may be, for example, the current day, the current month, the year-to-date, etc. For each time period there may be a bar graph which includes three (3) bars. The first bar is the planned revenue for the current time period which may be entered manually by a user. The second bar is the actual revenue for the current time period. The actual revenue is calculated automatically based on the invoice amounts as calculated and displayed in the arrival grid 152. The third bar shows the variance between the actual revenue and the planned revenue. The actual dollar amounts are shown in numerical form in the bars.

As described above, the GUI screen 150 provides the user various revenue information at a glance. The revenue information provided by the GUI screen 150 may be used for various purposes. For example, the information may be used to generate daily invoices for the various airlines. The user may select the specific airline view for the arrival grid 152 and then record or print out all the arrivals for each airline. The user may then prepare a daily invoice for the airline or may compare the airlines prepaid schedule to verify that the airline did not have any additional arrivals. If a prepaid airline had additional arrivals, the user may then invoice the airline for these additional arrivals. Thus, the information provided by the GUI screen 150 allows an airport operator to ensure that the airlines are invoiced properly. Those of skill in the art will understand that the above are examples and there may be many other purposes for which the information may be used.

Those of skill in the art will understand that the above revenue description was based on charging the airlines for arrivals. Similar revenue information may be displayed for an airport facility which charges based on departures and/or a combination of arrivals and departures. The live revenue screen described above and the archived revenue screen described below may be used by the airport authority to capture additional landing fee revenue for the airport facility. The revenue screens allow the airport authority to view all arrivals in a uniform and coherent manner to insure that arrivals (and the associated revenue) are not missed.

For example, there may be a class of customers which are non-signatories, i.e., customers who have not signed a reporting agreement with the airport facility. These customers are not required to report their arrivals to the airport facility. Thus, it is very easy for the airport facility to overlook these types of arrivals and miss charging the non-signatory customers for arrivals. The exemplary embodiment of the present invention allows the airport facility to easily track each arrivals and the billing for each arrival.

In addition, the revenue screens allow for a streamlined billing process since each of the arrivals are stored in one location, are viewable (or printable), and include detailed information about each arrival, the billing department may generate bills in a simple manner based on a query of the information presented by the revenue screens. The faster and more efficient billing cycle also speeds up the revenue collection process by the same amount of time. This improved billing and collection procedure may improve the cash flow of the airport facility, thereby allowing a more efficient operation in general.

In addition, the system allows for the tracking of non-payers and slow payers. For example, an airline, private jet owner, etc., may have a history of non-payment or slow payment of landing fees. The live revenue screen may allow the airport operator to track arrivals for the this particular customer. When there is an arrival by this customer, the live revenue screen allows the airport operator to know the exact charge for the arrival. The airport operator may then immediately generate a bill for this arrival and present the bill for payment to the customer.

FIG. 5 shows a fourth exemplary GUI screen 170 for presenting archived revenue information to a user. As shown in FIG. 5, the revenue archive view is highlighted in the current view portion 108 of the GUI screen 170. Similar to the live revenue screen described above, the GUI screen 170 allows a user to view reports of individual arrivals and revenue information. However, the archived view of the GUI screen 170 allows the user to view results over a longer period of time because the search is performed on archived data that may present multiple days of operations.

Because the archive view of GUI screen 170 has the ability to display large quantities of data for multiple day operations to the user, the GUI screen 170 includes a search portion 172 which allows the user to systematically search the archives stored on the main server 30. As shown in search portion 172, there are various search fields which the user may complete in order to refine the search. If the user desires to perform a broad search, the user may complete only a single field, while additional completed fields will narrow the search. The search fields may include a starting and ending date field, a flight number field, an arrival/departure field, an operation type field (e.g., scheduled, non-scheduled, domestic, international, etc.), a runway field, an aircraft type field, an origin field and an invoice amount (e.g., show all flights having a revenue greater than (n) dollars).

The user may also select whether the results of the search should be displayed on the GUI screen 170, printed on a printable format or downloaded to a spreadsheet program. Those of skill in the art will understand that these various output types are only exemplary and there may be other types of output formats which are supported by the system 1. Thus, a user will complete the desired fields in the search portion 172 of the GUI screen 170 and send the search command to the main server 30 to retrieve all the flight records matching the query parameters. The main server 30 will then send the results of the query to the user in the output format selected by the user.

In this example, the user selected to view the results on the GUI screen 170. The results are shown on arrival grid 174. Each result is shown on a line-by-line basis in a similar manner as described above for the arrival grid 152 of the exemplary GUI screen 150. Detailed information about each flight is provided in the arrival grid 174. The information is similar to the information described above for the arrival grid 152 of the exemplary GUI screen 150. The arrival grid 174 may also show the total number of results for each search (e.g., 217 arrivals in the example of FIG. 5).

In addition, the GUI screen 170 includes a series of arrival formatting buttons 176 which perform various sorting functions on the flight information displayed on the arrival grid 174. The first button is an airline button which, when pressed, sorts the results in the arrival grid 174 by airline and displays the results in a bar graph form in the place of the arrival grid 174. Similarly, the runway button sorts the results in the arrival grid 174 by runway and displays the results in a bar graph form in the place of the arrival grid 174. The origin button sorts the results in the arrival grid 174 by origin and displays the results in a bar graph form in the place of the arrival grid 174. Finally, the aircraft type button sorts the results in the arrival grid 174 by aircraft type and displays the results in a bar graph form in the place of the arrival grid 174.

As can be seen from the above description, the buttons perform a sorting function on the displayed search results and then display the results based on the sort requested by the user. Accordingly, additional buttons may be added based on any sort parameters which an individual user may desire to see the search results. The bar graphs for these search results will be of a similar type to the bar graphs described above for the arrival graph 120 and departure graph 122 of the GUI screen 100.

Thus, the archive view of the GUI screen 170 allows a user to select various search parameters in order view operational information segmented in various manners according to the search parameters. Those of skill in the art will understand that there are numerous reasons for selecting search parameters and multiple types of information which may be gathered from the results of these searches. The following is an example of how the search results may be used.

In this example, an individual airline may be self reporting, i.e., the airline informs the airport authority of all its arrivals in a reporting period and pays the appropriate amount based on this self reporting of arrivals. However, this system is based on the accuracy of the airline's records and may miss certain arrivals or variations in the schedule, for example, non-scheduled arrivals or aircraft substitutions. However, using the system 1 to perform a search on the revenue archive data on the main server 30 for the airline during the reporting period will allow the user to verify the accuracy of the airline's self reported arrivals. In addition, it will allow the user to verify the accuracy of the invoiced amounts for these arrivals based on the data provided in the system 1, e.g., the aircraft type, the flight fee and the maximum takeoff weight.

As described above, the data contained in the system 1 includes data collected from sources that actually record the flights as they arrive. A recorded arrival in the system 1 is based on the measured data from the aircraft as it arrives at the airport, not based on a manual input of data by a human operator. Thus, the system 1 will not miss an arrival because each set of collected data is correlated to a specific aircraft meaning that the users of system 1 may be assured that the recorded arrivals are actual arrivals.

As described above, the views described are only exemplary and there may be multiple other views which may be used to display information to the users of the system 1. For example, a data feed arrangement may input Mode S data or other types of data which includes a unique identifier for each aircraft, e.g., a unique tail number, a unique transponder code, a unique registration number, etc. An exemplary display may include the display of this unique identifier for each aircraft. In a further example, this unique code may be correlated to an ownership (or fleet) database which contains information about each aircraft, e.g., owner, country of registration, date of manufacture, engine type, seat configuration, etc. An exemplary display may display the unique identifier which then calls the contents of the fleet database and displays the information about the aircraft to the user.

In the preceding specification, the present invention has been described with reference to specific exemplary embodiments thereof. It will, however, be evident that various modifications and changes may be made thereunto without departing from the broadest spirit and scope of the present invention as set forth in the claims that follow. The specification and drawings are accordingly to be regarded in an illustrative rather than restrictive sense.

What is claimed is:

1. A system, comprising:
   a first computing device receiving data from an input feed, the data including operations data and revenue data of an airport facility, wherein the revenue data includes flight fee values and flight fee parameters, the first computing device calculating an airport usage charge for at least one aircraft based on the flight fees values and the flight fee parameters and organizing the data with the calculated airport usage change into files which are viewable by users of the system; and
   an additional computing device connected via a communication network to the first computing device, receiving the files organized by the first computing device and displaying the files to a user, wherein the viewable files include data for a plurality of aircraft.

2. The system according to claim 1, wherein the operations data is flight arrival data for an aircraft, the flight arrival data including one of a flight identifier, an estimated time of arrival, an actual time of arrival, a range of the aircraft, a runway of arrival, an airport of origination of the aircraft and an aircraft type.

3. The system according to claim 2, wherein the flight arrival data is displayed for a time frame selected by the user of the additional computing device.

4. The system according to claim 1, wherein the operations data is flight departure data for an aircraft, the flight departure data including one of a flight identifier, an estimated time of departure, an actual time of departure, a range of the aircraft, a runway of departure, an airport of destination of the aircraft and an aircraft type.

5. The system according to claim 1, wherein the communication network is one of an Internet, an intranet, a local area network and a wide area network.

6. The system according to claim 1, wherein the additional computing device receives the files via a web browser resident on the additional computing device.

7. The system according to claim 1, wherein the input feed is one of a manual input by the user of the system and an automatic input from a data collection system.

8. The system according to claim 1, wherein, when the first computing device receives additional data from the input feed, the first computing device updates the files and sends the updated files to the additional computing device.

9. The system according to claim 8, wherein the additional computing device redisplays the updated files to the user.

10. The system according to claim 1, wherein the first computing device stores the data received from the input feed in a permanent memory, the first computing device organizes a subset of the stored data into displayable files based on a request from the additional computing device.

11. A system, comprising:
a computing device calculating an airport usage charge for at least one aircraft based on flight fees values and flight fee parameters;
a first module configured to request displayable files from the computing device, the request being communicated via a communications network, the displayable files including operations data and revenue data of an airport facility, the revenue data includes the calculated airport usage change for the at least one aircraft;
a second module configured to display the displayable files to a user, displayable files being one of a live view of the data and an archived view of the data, wherein the displayable files are one of live view of the data and archived view of the data and include data for a plurality of aircraft.

12. The system according to claim 11, wherein the operations data is flight arrival data for an aircraft, the flight arrival data including one of a flight identifier, an estimated time of arrival, an actual time of arrival, a range of the aircraft, a runway of arrival, an airport of origination of the aircraft and an aircraft type.

13. The system according to claim 12, wherein the second module is further configured to permit the user to search the flight arrival data for a specific aircraft.

14. The system according to claim 11, wherein the second module is further configured to permit the user to query the data and redisplay the data based on the query submitted by the user.

15. The system according to claim 11, wherein the displayable files include color coded information which indicates related data to the user.

16. The system according to claim 11, wherein the operations data includes a runway configuration.

17. The system according to claim 11, wherein the operations data includes a gridlock alert indication.

18. The system according to claim 11, wherein the live view includes data for a current day.

19. The system according to claim 11, wherein the archived view includes data for multiple days.

20. The system according to claim 11, wherein the revenue data includes an invoice amount.

21. A method, comprising the steps of:
calculating, by a computing device, an airport usage charge for at least one aircraft based on flight fees values and flight fee parameters;
requesting displayable files from the computing device, the request being communicated via a communications network, the displayable files including operations data and revenue data of an airport facility, the revenue data includes the calculated airport usage change for the at least one aircraft; and
displaying the displayable files to a user, the displayable files being one of a live view of the data and an archived view of the data, wherein the displayable files are one of live view of the data and archived view of the data and include data for a plurality of aircraft.

22. A system, comprising:
a computing device calculating an airport usage charge for at least one aircraft arrival based on flight fees values and flight fee parameters;
a first display configured to display live operational data for an airport facility, the live operational data being information from a current day and including arrival information, departure information and runway configuration information for a first plurality of aircraft;
a second display configured to display archived operational data for the airport facility, the archived operational data being information for a predetermined time period and including arrival information and departure information for a second plurality of aircraft;
a third display configured to display live revenue data for the airport facility, the live revenue data includes information from the current day, the calculated airport usage change for the at least one aircraft arrival and an invoice amount for each arrival on the current day for a third plurality of aircraft; and
a fourth display configured to display archived revenue data for the airport facility, the archived revenue data being information for the predetermined time period and including the invoice amount for each arrival in the predetermined time period for a fourth plurality of aircraft.

* * * * *